United States Patent [19]
Geisthoff

[11] 4,417,650
[45] Nov. 29, 1983

[54] SAFETY CLUTCH

[75] Inventor: Hubert Geisthoff, Lohmar, Fed. Rep. of Germany

[73] Assignee: Jean Walterscheid GmbH, Lohmar, Fed. Rep. of Germany

[21] Appl. No.: 249,486

[22] Filed: Mar. 31, 1981

[30] Foreign Application Priority Data

Apr. 2, 1980 [DE] Fed. Rep. of Germany ....... 3012783

[51] Int. Cl.³ .............................................. F16D 43/20
[52] U.S. Cl. .................................. 192/56 R; 192/71; 464/37
[58] Field of Search .................. 192/56 R, 71; 464/37

[56] References Cited

U.S. PATENT DOCUMENTS

| 2,791,433 | 5/1957 | Dodd | 192/56 R X |
| 4,220,230 | 9/1980 | Hansen | 192/56 R |
| 4,261,453 | 4/1981 | Kunze | 192/56 R |

FOREIGN PATENT DOCUMENTS 1183748 12/1964 Fed. Rep. of Germany .... 192/56 R
8565 11/1954 German Democratic Rep. .
181775 12/1962 Sweden .............................. 192/56 R

*Primary Examiner*—Rodney H. Bonck
*Attorney, Agent, or Firm*—Toren, McGeady and Stanger

[57] ABSTRACT

A clutch particularly suitable for machine drives in agricultural implements including a clutch hub, a clutch sleeve, and spring-loaded dog members operative to engage and disengage within tapered recesses in said clutch sleeve for controlling torque transmission through the clutch. The recesses are formed with a circumferential dimension large enough to accommodate therein movable control members together with engagement heads of the dog members. The control members cooperate with the dog members within the recesses to effect disengagement of the clutch when a maximum torque is exceeded and to automatically effect re-engagement of the clutch upon achievement of a nominal speed whereupon the dog members, which are spring-loaded in the clutch hub, may automatically re-engage within the recesses.

7 Claims, 8 Drawing Figures

SAFETY CLUTCH

The invention relates generally to clutch mechanisms and, more particularly, to a safety clutch for protecting machine drive lines especially useful in connecting the drive shafts of agricultural implements such as tractors or the like.

A clutch mechanism of the type to which the present invention relates generally consists of a clutch hub and a clutch sleeve, with spring-loaded dog members guided in pockets of the clutch hub being operative to engage within recesses in the clutch sleeve to effect torque transmission between the hub and the sleeve. The dog members may be formed with wedged engagement heads and the clutch sleeve recesses taper radially outwardly for engagement with the wedged heads.

Safety clutches operating on the principle of a clutch ratchet are known in the art. However, disadvantages commonly found in such ratchet clutches involve high noise levels, overheating and high degrees of wear. It has been attempted to avoid such disadvantages by, means of a switching effect as indicated in the prior art in East German Pat. No. 8568. In the case of the safety clutch described therein, spring loaded dog elements which are designed as spherical balls are guided in one part of the clutch and engage into groove-type notches of the other part of the clutch. The notches guide prismatic filler pieces which, after the balls have moved out of the grooves of the other part of the clutch in the case of clutch overloading, are pushed radially outwardly by centrifugal force. Thus, the grooves are closed for the balls in the torque transmitting position. The safety clutch is thus switched into a free wheeling position and the balls move across the filler pieces without an unpleasant rattling effect commonly found in ratchet clutches of the prior art.

The outer ends of the grooves are provided with apertures whereby by means of engagement of a tool, the filler pieces may be moved back into the starting position. As a result, the safety clutch may be switched back into torque transmitting condition.

The disadvantage of a design of the type described is that for the purpose of re-engaging the safety clutch, driving operation must be terminated completely and a manual operation is necessary in order to re-establish the torque transmitting condition. Thus, when using such a clutch for safety purposes in a drive line between a tractor and an agricultural implement, the tractor operator must leave the tractor after each case of overloading in order to manually place the clutch into the working position. This places an unacceptable burden on the tractor operator, particularly when work is being performed in difficult areas such as stony fields.

Thus, it is the purpose of the present invention to provide a safety clutch which operates on the ratchet principle and which will automatically switch to a free wheeling position when a predetermined nominal torque is exceeded, with the clutch returning to the torque transmitting position without requiring any manual operation. For example, with the clutch of the present invention, return to the torque transmitting condition may occur simply by reducing the drive speed. The invention also provides a simple design which involves reasonable production costs.

SUMMARY OF THE INVENTION

Briefly, the present invention may be described as a clutch for a machine drive wherein the recesses in the clutch sleeve are formed with a dimension in the circumferential direction which is longer than the engaging wedged head parts of the dog members. The outside of the wedge-shaped head parts of the dog members are provided with flattened faces and in the torque transmitting position, the space remaining in the recesses is filled in each case by a movable control strip. If the dog members are not engaged in the recesses, the distance of movement of the control strips in the circumferential direction is equal to or smaller than the head width of the flattened face of the dog members.

Adjustment in the circumferential direction between the length of the recesses, the distance of movement of the control strips and the head width of the flattened areas of the dog members ensures that as a result of frictional forces between the control strips and the dog members, the control strips are moved along in the recesses in the direction of rotation after an overloading has occurred and they are made to stop thereby producing, on the side of the recesses away from the direction of rotation, a compensation space which is not however large enough for the head parts of the dogs to enter and engage. However, on the side of the recesses facing the direction of rotation, there remains a space which is geometrically sufficient for the head parts of the dog members to fall into to a certain radial degree but which on the other hand is not large enough for the head parts of the dog members to catch in the space when the safety clutch continues to run at nominal speed.

The effect of the foregoing is that after overloading the safety clutch continues to rotate at a greatly reduced torque. The invention thus avoids many of the disadvantages commonly found in ratchet clutches.

However, when speed is reduced, it becomes possible for the head parts of the dog members to engage in the spaces facing the direction of rotation and to push back the control strips in the recesses against the direction of rotation. This process is favored by the considerable rotational vibrations occurring when driving agricultural machinery as a result of which the safety clutch will automatically switch back into the torque transmitting position.

In a further feature of the invention, the space remaining in the recesses in the torque transmitting position is filled by two control strips which are arranged on each side of the head part of the dog member.

This design of the safety clutch has the advantage that it is suitable for use in drive mechanisms which operate in two directions of rotation.

In accordance with a further characteristic of the invention, the control strips project from the recesses toward the clutch hub on the side thereof away from the direction of rotation. An advantage of this design is that the control strips will be positively switched to the free wheeling position by the head parts of the dog members thereby avoiding any dependence upon any changes in frictional conditions within the safety clutch which might be the result of lubrication or similar effects.

In a further embodiment of the invention, the radial thickness of the control strips is increased in the direction of rotation allocated thereto.

Because of the wedge-shaped design of the control strips, they will receive a force component acting in the direction of rotation as a result of the spring force transferred thereto by the head parts of the dog members.

In accordance with a further advantageous characteristic of the invention, the control strips are formed to be thicker than the depth of the recesses taken in the radial direction and each control strip is provided with an extension pointing away from the center of the recess in the circumferential direction and covering at least partially the inner annular face of the clutch sleeve.

This embodiment of the invention provides the advantage that the head parts of the dog members when passing through the safety clutch do not slide along the inner wall of the clutch sleeve, but are supported by the inner face of the control strips or their extensions. This arrangement avoids any type of wear on the clutch sleeve so that partial hardening of the running face of the clutch sleeve may not be necessary.

In a further advantageous embodiment of the invention, some of the recesses are provided with movable control strips and others are provided with an opening corresponding to the shape of the head parts of the dog members.

Since some of the recesses do not have a control function, it is possible to establish a residual torque which will meet existing requirements.

A further advantage is that by partially maintaining the complete ratchet function, re-engagement is facilitated thereby in turn reducing the requirements with respect to production tolerances.

In the case of single-row safety clutch, partial omission of the control function is achieved by designing part of the recesses of the clutch sleeve accordingly and, in the case of ratchet rows arranged one behind the other, such partial omission of the control function is achieved by designing the recesses of one or several of the ratchet rows accordingly.

In order to reduce susceptibility to wear and to achieve softer characteristics, it is advantageous to provide the flattened faces of the wedge-shaped head parts with a slightly curved configuration.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
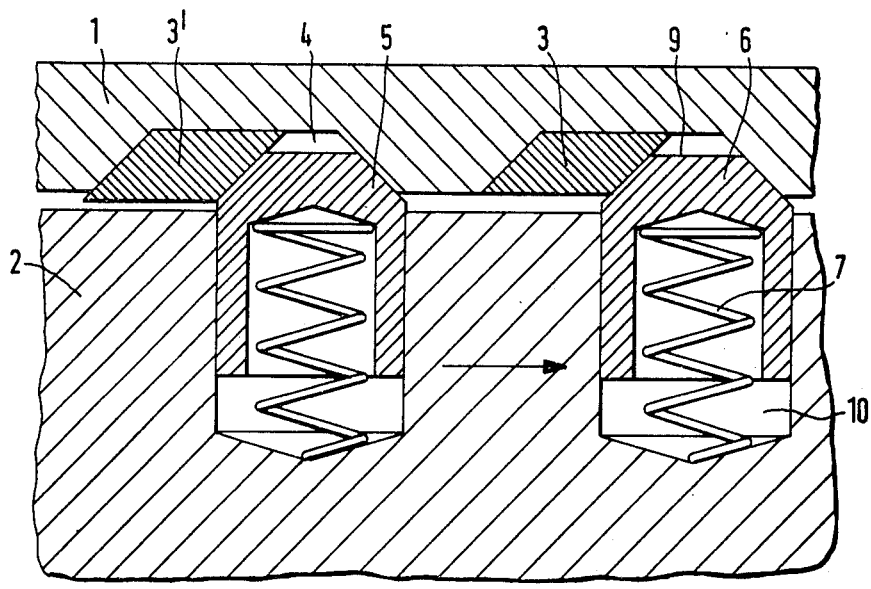
FIG. 1 is a partial sectional view of a safety clutch in accordance with the present invention shown in torque transmitting condition.

A clutch assembly which is an example of the present invention is shown in FIG. 1 as comprising a clutch hub 2 which acts as the driving member having on its outer circumference pockets 10 within which dog members 5 are held and loaded radially outwardly by means of a spring 7. A clutch sleeve 1 is rotatably supported relative to the clutch hub 2, with the sleeve 1 being provided with recesses 4 which are distributed across the circumference thereof and which are tapered radially outwardly. The dog members 5 include wedged engagement heads 6 which are adapted to engage within the recesses 4 in order to place the clutch in torque transmitting engagement.

It will be seen that the width, taken in the circumferential direction, of the recesses 4 is greater than the width of the wedged engagement heads 6. Therefore, with the wedged engagement heads 6 in torque transmitting engagement in the recesses 4, a remaining space will exist. This remaining space is filled with control strips which in the representations of FIGS. 1-4 are variously identified by reference numerals 3, 3', 3", and 3'''.

In a case where overloading of the clutch develops, the clutch sleeve 1 will be braked or it will be stopped immediately as a result of which the dog members 5 will be drawn out of the recesses 4 moving radially inwardly of the clutch hub 2 because of the wedge shape of the engagment heads 6. The dog members 5 following from the side away from the direction of rotation move the control strips 3 from the side of the recesses 4 away from the direction of rotation to the sides of recesses 4 facing the direction of rotation. Because of the predetermined distance of movement of the control strips 3, space 8 consequently forming in the recesses 4 on the side away from the direction of rotation is smaller than the flattened faces 9 of the wedged engagement heads 6 of the dog members 5. As a result, the dog members 5 cannot fall into the compensation spaces 8, but move past these spaces.

On the side of the recesses 4 facing the direction of torque transmission, because of the movement of the control strips 3, there is no opening corresponding to the size of the wedged engagement heads 6 but an opening whose width is only slightly greater than the flattened face 9.

Therefore, if the clutch hub 2 continues to rotate a nominal speed, the force applied by spring 7 to the dog members 5 in the direction of engagement is not sufficient to accelerate the dog members 5 to such an extent that they can at least partially fall into the remaining space 12. The safety clutch therefore continues to rotate at a reduced torque.

By reducing the nominal speed, the time which is available for the dog members 5 to fall into the remaining spaces 12 is extended to such an extent that the wedged engagement heads 6 of the dog members 5 can at least partially fall into or catch within the spaces 12. If in the meantime the cause for the overload condition has been removed, the wedged engagement heads 6 of the dog members 5 fall into the recesses 4 of the clutch sleeve 1 while the control strips 3 move against the direction of rotation. The return movement of the control strips 3 is promoted by the rotational vibrations occurring in the drive of the agricultural machinery.

In addition to the spring force acting on the dog members 5, the difference in length between the space 12 and the flattened faces 9 also operates to determine the speed at which the clutch will re-engage for torque transmission.

On the left hand side of FIG. 1, there is illustrated a control strip 3' which projects from the clutch sleeve 1 radially inwardly by a finite dimension. Such a control strip 3' is moved positively by the engagement heads 6 of the dog members 5 from the torque transmitting position into the free wheeling position.

Figure 2:
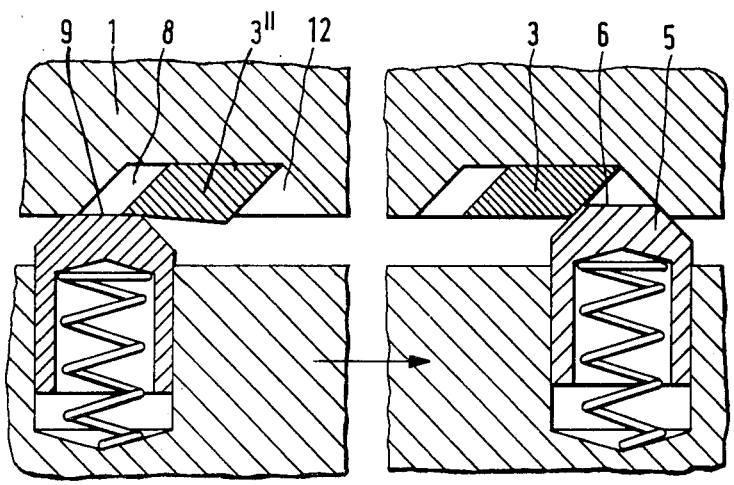
FIG. 2 is a sectional view showing the free wheeling position of a dog member on the left hand side thereof and the starting position for re-engaging into the torque transmitting condition on the right hand side thereof.

The left hand side of FIG. 2 shows the flattened face 9 of the wedged engagement head 6 moving over the compensation space 8 which is on the side of a recess 4 away from the direction of rotation and which is produced by moving a control strip 3''. The control strip 3'' which is illustrated on the left hand side of FIG. 2 is formed with a thickness which increases in the direction of rotation and as a result of this, in addition to the friction occurring between the flattened face 9 and the control strips 3'', a force component acting in the direction of rotation is applied.

On the right hand side of FIG. 2, there is shown a developed view of the stage of re-engagement of the safety clutch into the torque transmitting position. Due to a reduced speed, the wedged engagement head 6 of the dog member 5 has had an opportunity of catching into the remaining space 12 of the recess 4. As a result, and helped by the existing rotational vibrations, it is capable of moving the control switch 3 against the direction of rotation far enough to enable the wedged head 6 to fall completely into the space 12 of the recess 4.

Figure 3:
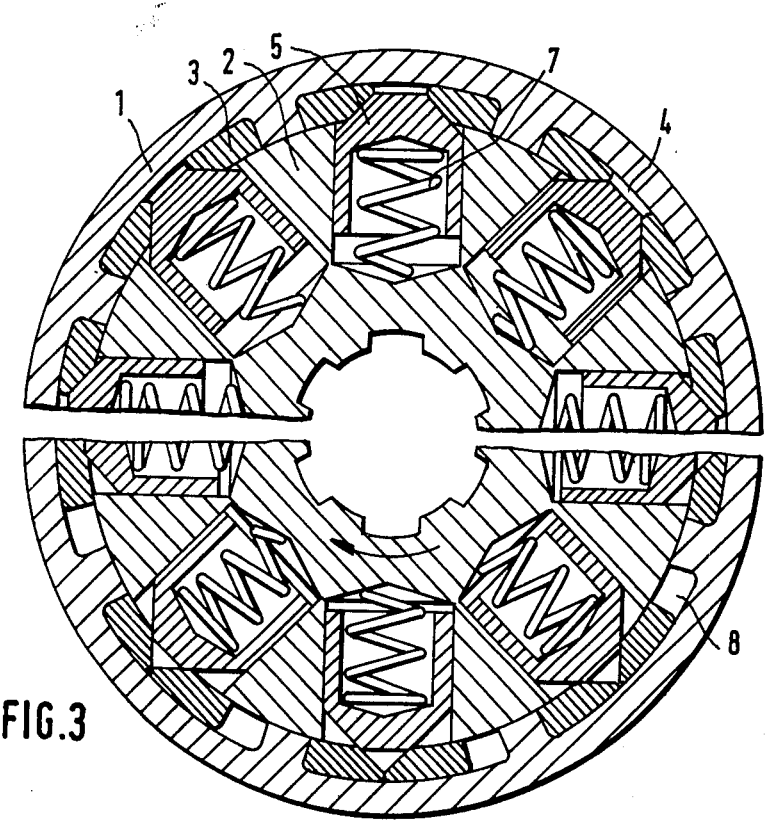
FIG. 3 is a sectional view taken through a safety clutch having two control strips in the torque transmitting position arranged on either side of the head part of the dog members with the upper half showing the torque transmitting position and the lower half showing the phase of switching the safety clutch from the free wheeling to the torque transmitting position.

FIG. 3 shows a safety clutch where each recess 4 in the clutch sleeve on either side of the wedged engagement head 6 of the dog member 5 contains a control strip 3. In the case of this embodiment, the safety clutch is capable of acting in both directions of rotation as an overload ratchet with a reduced free wheeling torque. The upper half of FIG. 3 shows the safety clutch in the torque transmitting position while the lower half illustrates the initial phase of switching of the clutch from the free wheeling position into the torque transmitting position, with the clutch hub rotating in the direction indicated by the arrow.

Figure 4:
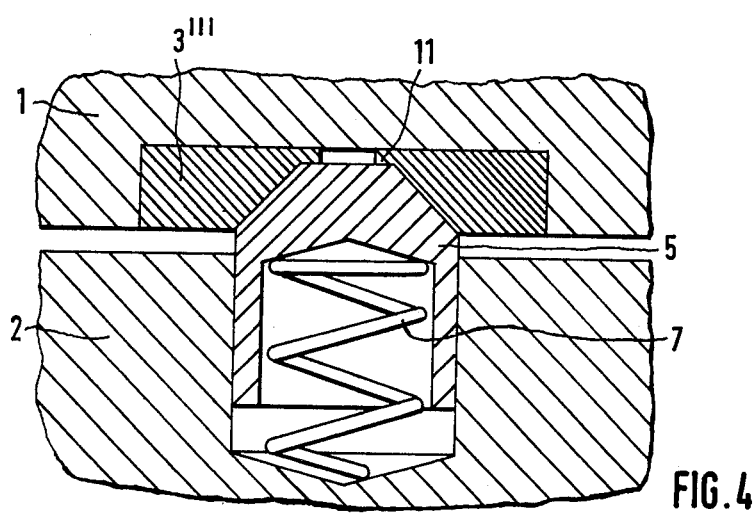
FIG. 4 is a sectional view showing a safety clutch with control strips provided with projections partially extending over the flattened face of the wedged engagement head of the dogs.

FIG. 4 shows a safety clutch wherein control strips 3''' have been provided which include projections arranged in the direction of the engagement heads 6 of the dog members 5 and contributing toward determining the distance of movement of the control strips 3'''.

Figure 5:
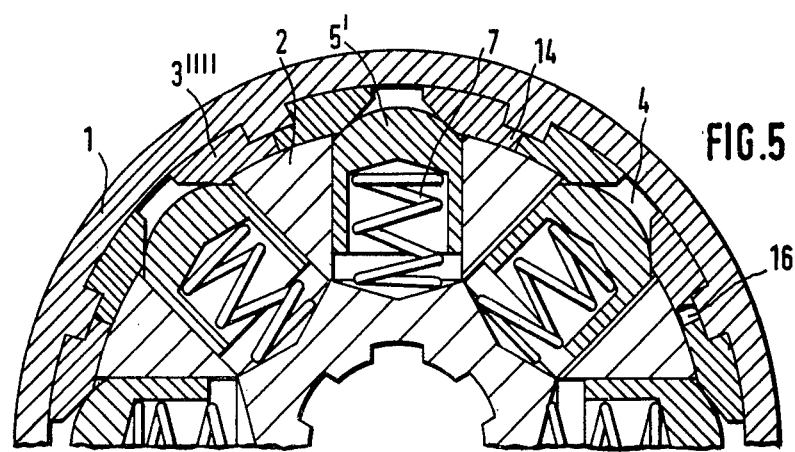
FIG. 5 is a sectional view showing half of a safety clutch in a case where the engagement head of the dog members is formed with a slightly curved end face and wherein the control strips have been provided with an extension which at least partially covers the inner annular face of the clutch sleeve.

In FIG. 5 there is shown a safety clutch which is provided with dog members 5' formed with their flattened faces 9 having a slightly curved configuration.

The thickness of the control strips 3'''' illustrated in FIG. 5 taken in the radial direction is greater than the depth of the recesses 4. The control strips 3'''' project into an annular space 16 arranged between the clutch sleeve 1 and the clutch hub 2 and in the circumferential direction they are each provided with extensions 14 which extend from the center of recesses 4 and which at least partially cover the inner cylindrical face of the clutch sleeve 1. The length of the extensions in the circumferential direction is designed in such a way that in the switched-off position the space forming between the two extensions 14 is not large enough for the dog members 5 to catch.

Figure 6:
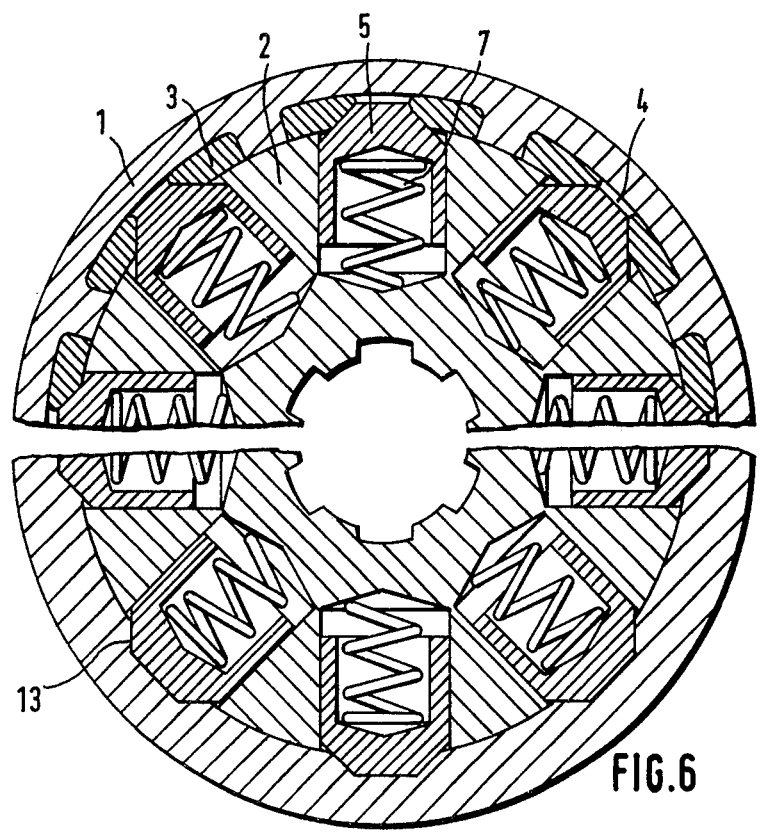
FIG. 6 is a sectional view through a safety clutch wherein the upper half shows dog members having the function of control cams and the lower half shows dog members having purely the function of working cams.

FIG. 6 depicts a safety clutch which combines the controlled ratchet function described thus far with a conventional ratchet function.

The upper half of FIG. 6 depicts the controlled ratchet design and the lower half the known uncontrolled ratchet.

FIG. 6 illustrates the principle only and in practice an even distribution of the two functions in the required ratio will be sought to be attained.

Figure 7:
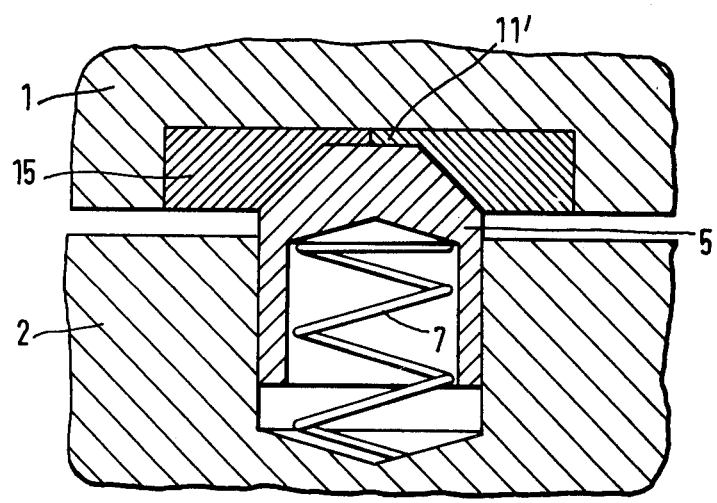
FIG. 7 is a sectional view illustrating the case where a recess of the clutch sleeve is adapted to the engagement head of a dog member by adjoining filler strips.

FIG. 7 shows a rather economical design for producing a combined safety ratchet wherein the recesses 4 of the clutch sleeve 1 are all produced with the same cross-section and wherein uncontrolled ratchet function is achieved by inserting the corresponding filler strips 15.

Figure 8:
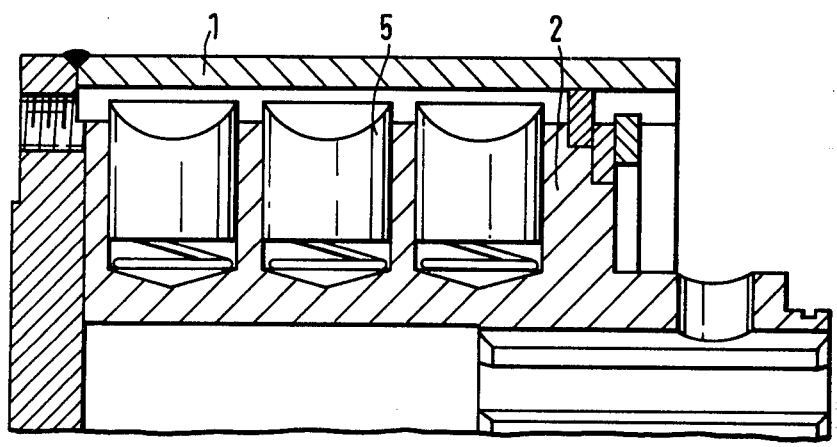
FIG. 8 is a longitudinal section through a ratchet clutch composed of several rows of ratchets.

FIG. 8 is a longitudinal sectional view through half a multi-row safety clutch in the case of which it is possible to allocate to the individual rows one of the aforementioned functions, depending upon requirements, in order to achieve a desired combination effect.

While specific embodiments of the invention have been shown and described in detail to illustrate the application of the inventive principles, it will be understood that the invention may be embodied otherwise without departing from such principles.

What is claimed is:

1. A clutch for machine drives particularly suitable for agricultural implements comprising a clutch hub, a clutch sleeve, tapered recesses in said clutch sleeve, and spring loaded dog members having wedged engagement heads with a flattened face for engagement in said recesses for transmitting torque between said hub and said sleeve, said recesses having a circumferential dimension larger than the circumferential dimension of said wedged engagement heads of said dog members such that when said dog members are in torque transmitting position within said recesses, a remaining space is provided which is occupied by movable control strips and such that when said dog members are not engaged in torque transmitting position within said recesses the distance of movement of said control strips in the circumferential direction is equal to or smaller than the head width of said flattened face.

2. A clutch according to claim 1 adapted to operate in both directions of rotation wherein the remaining space in said recesses is filled by two control strips arranged on either side of said engagement heads of said dog members in the torque transmitting position.

3. A clutch according to claim 1 or 2 wherein on a side thereof away from the direction of rotation, said control strips project from said recesses toward said clutch hub.

4. A clutch according to claim 1 or 2 wherein the radial thickness of said control strips increases taken in the direction of rotation of said clutch.

5. A clutch according to claim 1 or 2 wherein in the radial direction said control strips are thicker than the depth of said recesses, said control strips each being provided with extensions pointing away from the center of said recesses in the circumferential direction and at least partially covering the inner annular face of said clutch sleeve.

6. A clutch according to claim 1 wherein some of the recesses in said clutch sleeve are provided with movable control strips and wherein others of said recesses are provided with an opening corresponding to the shape of said engagement heads of said dog members.

7. A clutch for machine drives particularly suitable for agricultural implements comprising a clutch hub, a clutch sleeve, tapered recesses in said clutch sleeve and spring-loaded dog members having wedged engagement heads for engagement in said recesses for transmitting torque between said hub and said sleeve, said recesses being dimensioned in the circumferential direction thereof to provide therein space for accommodating said engagement heads of said dog members and control strips, said control strips being accommodated within said recesses and configured to cooperate with said engagement heads and said recesses such that said clutch will disengage when a predetermined maximum torque is transmitted therethrough, said control strips, said dog members, and said recesses operating cooperatively to automatically effect re-engagement of said clutch at a predetermined nominal speed.

* * * * *